United States Patent
Adoc et al.

(10) Patent No.: US 12,206,956 B1
(45) Date of Patent: Jan. 21, 2025

(54) LIVE EVENT ENHANCING AND BROADCASTING

(71) Applicant: Amazon Technologies, Inc., Seattle, WA (US)

(72) Inventors: Mario V. Adoc, Seattle, WA (US); Jeremy L. Bird, Lees Summit, MO (US); Kuldeep Sharma, Brampton (CA); Jean-Christophe Claude Morizur, Mountain View, CA (US); Brent Allen Colson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 18/128,864

(22) Filed: Mar. 30, 2023

(51) Int. Cl.
*H04N 21/81* (2011.01)
*G06F 9/54* (2006.01)
*H04N 21/2187* (2011.01)

(52) U.S. Cl.
CPC ......... *H04N 21/8126* (2013.01); *G06F 9/547* (2013.01); *H04N 21/2187* (2013.01)

(58) Field of Classification Search
CPC . H04N 21/8126; H04N 21/2187; G06F 9/547
See application file for complete search history.

(56) References Cited

PUBLICATIONS

Support—Video Central (Amazon.com), "API Documentation", Available Online at: https://videocentral.amazon.com/home/help?topicId=GQR5N2UECMUN6LKT&ref_=avd_sup_GQR5N2UECMUN6LKT, Mar. 20, 2023, 4 pages.
Support—Video Central (Amazon.com), "Live Event Data Quality Standards", Available Online at: https://videocentral.amazon.com/home/help?topicId=G93H6S5VB23EPQ3U&ref_=avd_sup_G93H6S5VB23EPQ3U, Mar. 20, 2023, 5 pages.
Wikipedia, "Over-the-top Media Services", Wikipedia, Available Online at: https://en.wikipedia.org/wiki/Over-the-top_media_service, Mar. 1, 2023, 5 pages.
Wikipedia, "SCTE-35", Available Online at: https://en.wikipedia.org/wiki/SCTE-35, Feb. 14, 2023, 2 pages.

*Primary Examiner* — Anthony Bantamoi
(74) *Attorney, Agent, or Firm* — Kilpatrick Townsend & Stockton LLP

(57) ABSTRACT

Methods and systems are disclosed. The methods and systems receive partner metadata and third party metadata, and generate lifecycle data and catalog data based on the partner metadata and the third party metadata. The methods and systems also receive event data and generate broadcastable consumer data based at least in part on the partner metadata, the third-party metadata, or the event data. The broadcastable consumer data includes partner metadata modified by the computing device.

20 Claims, 8 Drawing Sheets

LIVE EVENT ENHANCING AND BROADCASTING

BACKGROUND

Live events, such as sporting events, are desirably broadcast with information, such as statistical information, where the information is sourced by either of the broadcasting partner source of the live event or a third-party information provider. In addition, data provided by the broadcasting partner source may be used to generate catalog data for the live event and lifecycle data for the live event.

BRIEF DESCRIPTION OF THE DRAWINGS

Various embodiments in accordance with the present disclosure will be described with reference to the drawings, in which.

DETAILED DESCRIPTION

Figure 1:
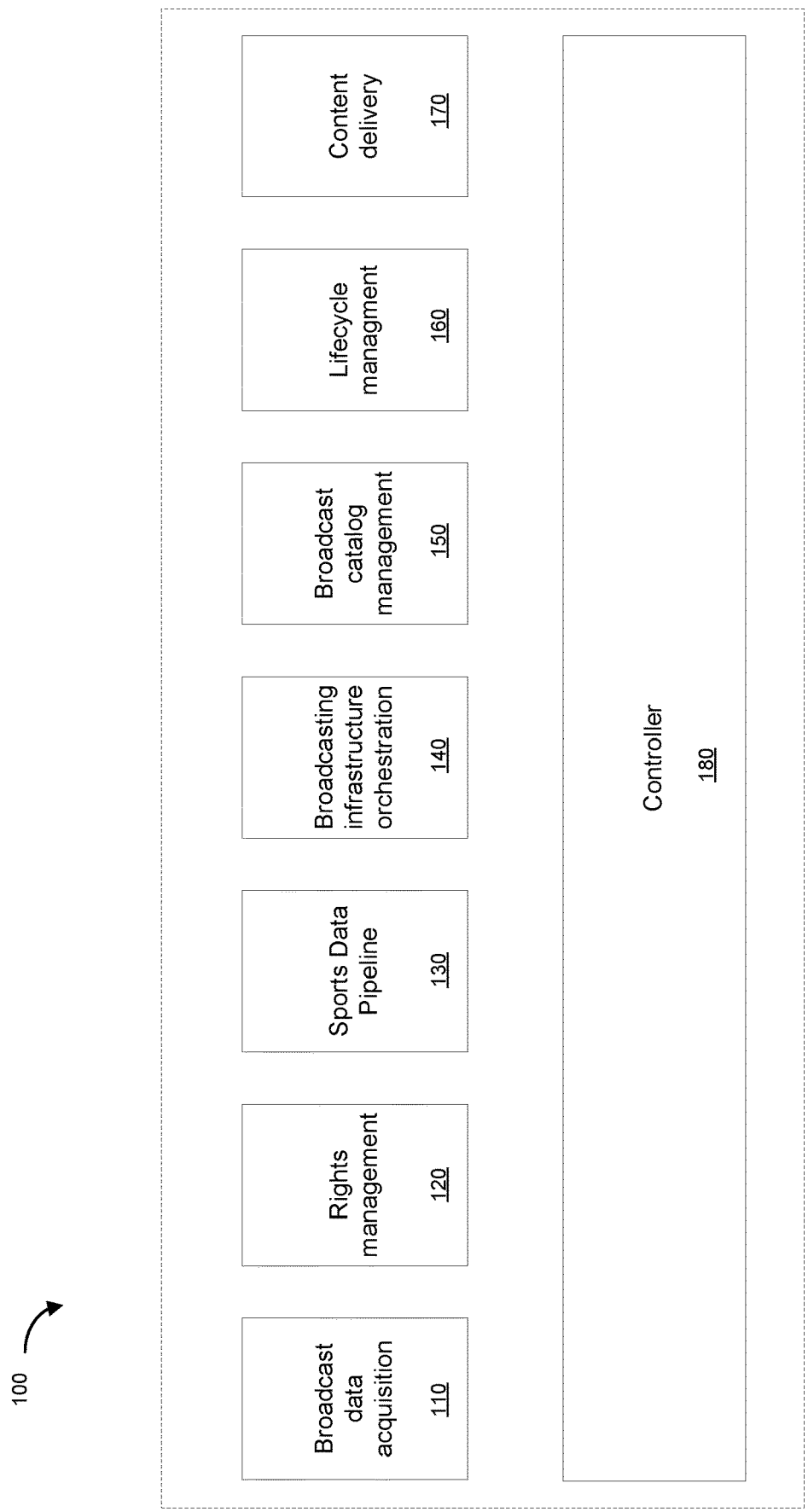
FIG. 1 illustrates a simplified block diagram of a content distribution platform 100 according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain embodiments have an architecture related to the concept of Digital Media Supply Chain. Digital media supply chain is the process of acquiring, managing, and distributing digital media assets (Video, audio, text, and other data like scores). The architecture identifies functional components which are relevant for broadcast (or aired) videos as in-scope digital media assets. Some embodiments use two broad domains for broadcasts-1) Partner domain, to include broadcast partners' (1P or 3P) problem of sourcing metadata, content and distribution to content distribution platforms, such as over-the-top (OTT) platforms like Amazon Prime Video (PV); 2) Sports Partner Integration (SPIN) domain, where content distribution platforms integrates with partners to acquire broadcast content and metadata. Some embodiments identify functional boundaries within SPIN and content distribution platforms.

Some embodiments acquire sports video content from ad-hoc broadcast distributors for increasing sports video selection. For example, broadcast partner distributors may include ad-hoc sports broadcast content and metadata distributors (e.g., Discovery and Paramount). Broadcast metadata may include a number of categories. For example, broadcast metadata may include: 1) Editorial: Title, description & images; 2) Sports factual data: sports, league, participant, etc.; 3) Rights & Policy: Recording rights, regional restrictions & ads policy; 4) Schedule: broadcast setup, start time & duration; and 5) Feed configuration: resolution & other live feed configs. In some embodiments, the content distribution platform exposes one or more APIs for enabling partners to submit the broadcast metadata and receive, for example, timely feedback for required interventions and quality improvements. Throughout the discussion the one or more partner exposed APIs are collectively referred to as an API, which may be implemented as a single API or as multiple APIs. Some embodiments increase content distribution platform content selection to match partners' direct to customer (D2C) offering by automating event on-boarding and automated quality checks. Automated metadata and broadcast content quality checks will help in eliminating eyes-on-glass and enable manage by exception. Some embodiments, upon detection of quality insufficiencies one or more or all of: automatically correct the quality insufficiencies, automatically notify partners of the quality insufficiencies, automatically request corrections of the quality insufficiencies from partners. Some embodiments accommodate partner and program agnostic capabilities which are consistently applicable to other content distribution platform selection initiatives like Pay-per-view and Location based viewing. In some embodiments, are implemented using functionally decoupled components, for example, to avoid creating monolithic or multiple-responsibility components. Decoupled components also help contain the blast radius of software changes across features.

In some embodiments, the content distribution platform architecture ingests ad-hoc content at scale. For example, the architecture identifies functional components which are agnostic of the architecture and applies the content to Live Events on Linear (LEL) and IP events. The architecture addresses various themes to deliver partner/customer value. For example, in addition to other themes, the architecture 1) Receives and prepares partner sourced broadcast metadata, 2) Performs validation and quality check and modification of broadcast metadata, 3) Orchestrates broadcasting infrastructure, 4) Performs broadcast video catalog management, and 5) Performs broadcast lifecycle management tasks.

In some embodiments, the architecture automatically checks quality of metadata sourced from partners to verify and/or enforce baseline expected standards. With established metadata quality, the architecture publishes customer facing ad-hoc content while achieving-a) Automation of QC capabilities, and b) Enhancement of video catalog data. In some embodiments, the architecture uses other programs like automated merge of multi-sourced events (MSE) in the detailed workstreams.

Theme-1: Receiving and Preparing Partner Sourced Broadcast Metadata.

In accordance with this theme, a Broadcast metadata acquisition component provides partner facing APIs (P-APIs) to capture broadcast video metadata and prepare the metadata for distributing it to downstream systems, such as a Playback component, a Lifecycle Management component, and a switched virtual circuit (SVC) component. Components within the Broadcast metadata acquisition component capture, for example, editorial, sports, and scheduling information, for example, with the P-APIs. The Broadcast metadata acquisition component may also be configured to provide a ledger functionality to record partner provided metadata referred as "Partner Contributions" for manual or automatic quality checks and enhancements, which, for example, are used to ensure completeness, correctness, and timeliness of metadata. Some embodiments, upon detection of quality insufficiencies one or more or all of: automatically correct the quality insufficiencies, automatically notify partners of the quality insufficiencies, automatically request corrections of the quality insufficiencies from partners.

In some embodiments, the Broadcast metadata acquisition component includes a Partner Entity Ingestion Adapter component to—a) Resolve existing LEL vendor configuration for provided partner station identifier, and b) Submit feed info, rights & policies extracted from vendor configuration along with other partner contributions to SVC for publishing detail pages. In some embodiments, a test detail page is published using existing experiment group capability. In some embodiments, the quality check and enhancement functions correct issues in the staged partner contributions which breaks the flow of data to publish detail pages. Some embodiments, upon detection of quality insufficiencies one or more or all of: automatically correct the quality insufficiencies, automatically notify partners of the quality insufficiencies, automatically request corrections of the quality insufficiencies from partners.

In some embodiments, P-APIs support capturing-a) Broadcast feed configuration, and b) Rights & Policy information. In some embodiments, a Rights and Policy Resolution component also operates to resolve partner level policies (e.g., recording policy and discovery windows) and deal information. In some embodiments, lookup of deal information by the Rights and Policy Resolution component is automated because the Rights and Policy Resolution component interfaces or is integrated with a Deals Playbook component. Rights and policy resolution results may be recorded to, for example, comply with any legal auditing requirements. In some embodiments, partner specific integration (e.g.—Adapting to a poll model, such as that used by Paramount+instead of an API based push model) adapters are used, for example, integrated with or outside of Broadcast metadata acquisition component boundary and towards partner domain.

Theme-2: Validation and QC of Broadcast Metadata

Some systems, such as Disney+, publish metadata of 16 LEL, or the like, stations as EPG files, or the like, in a shared file storage location with Digiflex, or the like, operators. In some systems, Partner Onboarding Managers (POM) assess the quality of the EPG files and schedule update quality for events to establish quality baseline for broadcast level partner contributions. In some embodiments, initial QC identifies gaps and direction for prioritizing automated QC and intervention capabilities. In some embodiments, manual QC may additionally or alternatively be used, for example, where the detail page publishing logs is recorded (both failure and success logs). In some embodiments, a detail page is QC'd manually by, for example, Digiflex for quality based on live event data quality standard (e.g.—in parity with IP data quality). Issues with partner sourced metadata may be reported back to partner via, for example, daily or weekly reports using automated communications. Some embodiments, upon detection of quality insufficiencies one or more or all of: automatically correct the quality insufficiencies, automatically notify partners of the quality insufficiencies, automatically request corrections of the quality insufficiencies from partners.

Historically, it has been a challenge to monitor the content within a broadcast feed (e.g. —EPL feed showing in-between slates which risks ending broadcast streams). However, in embodiments discussed herein, monitoring of broadcast content is automated. In some embodiments, QC of broadcast metadata is automated. In some embodiments, selective or limited manual QC may be performed, for example, by exception. In some embodiments, validation results and quality metrics are both managed by a Real-time data sink (RTDS) component. In some embodiments, the RTDS component is monitored for identifying & allotting manual intervention work (e.g.—intervene if basketball titled event is actually baseball).

In some embodiments, Playback quality (Quality of Service-QoS) metrics are also managed by the RTDS component, and are used for reporting back to a partner using Reporting APIs (R-APIs).

Theme-3: Broadcasting Infrastructure Orchestration

In some embodiments, a LEL vendor configuration process launches, for example, 16 Disney+ ad-hoc stations. In some embodiments, feed configuration and policy information is provided by the broadcast/partner to dynamically stand-up or tear down the playback feed infrastructure according to a dynamic feed orchestration process. The dynamic feed orchestration process enables, for example, Partners, such as Paramount+ and Disney+, to drop 24/7 linear stations. Additionally or alternatively, the dynamic feed orchestration process may enable the content distribution platform to eliminate or reduce the need to maintain 24/7 linear feeds. In some embodiments, the content distribution platform architecture includes a set of "Spectrum" systems which act as portal for setting up dynamic feeds. In some embodiments, the architecture extracts out broadcast asset (VCID) acquisition from a Live Events Ingestion (LEI) process and submits these broadcast assets into broadcast catalog management component 150. Moving VCID assignment upward decouples video asset management from catalog management and simplifies the system. In some embodiments, a recording orchestrator (LEROS) may be integrated with or may be outside of SVC.

In some embodiments, on-boarding linear ad-hoc feeds are scaled by simplifying-a) Setup of station level vendor configuration, and b) Testing of linear feeds. These simplifications of content distribution platform enable or simplify on-boarding of remaining numerous additional ad-hoc stations and additional linear ad-hoc stations, which may, for example, require manual effort.

Theme-4: Broadcast Video Catalog Management

In some embodiments, P-APIs ensure sufficient data is collected in order to publish a detail page. With P-APIs having captured metadata and right/policy information captured as part of vendor configuration, the content distribution platform architecture publishes detail page according to the captured metadata and right/policy information. Partner sourced broadcast metadata may be transmitted to SVC via an interface, for example, provided by the Video Catalog Reception component. The APIs provided by catalog reception may be referred to as SVC APIs or C-APIs. C-APIs define a minimum set of data required for publishing a quality detail page. In some embodiments, the C-APIs at least capture data in parity with the data supplied by LE-APIs via vendor configuration for an LEL event which includes region level territory restriction and support for experiment group. Some embodiments, upon detection of quality insufficiencies one or more or all of: automatically correct the quality insufficiencies, automatically notify partners of the quality insufficiencies, automatically request corrections of the quality insufficiencies from partners.

In some embodiments, the content distribution platform architecture matches or selects partner provided sports broadcast metadata with sports entity present, for example, in a Sports Data Pipeline (SDP). The SDP may include, one or more sources of sports data, and is not limited. For example, the sports data may include information associated with teams, leagues, players, coaches, and other sports related entities, and may be collected by and distributed or sourced by a sports data aggregator or a sports data aggregator service. In some embodiments, the sports data aggregator service is implemented as part of content distribution platform 100. In some embodiments, the sports data aggregator service is a third-party source, such as a third-party sports data vendor. In some embodiments, a high match rate enables enhancing of catalog data (improving quality or filling missing data). In some embodiments, a baseline match rate is recorded for prioritizing programs. In some embodiments, C-APIs ingest VCID as referred in Theme-3 above.

The catalog data may be used by content distribution platform 100 to publish scheduled or available content catalog information for users. For example, a user may access catalog information with a user interface to determine which programs and broadcasts are available or scheduled. Accordingly, the catalog data includes program or event or broadcast characterizing information such as event title, participant names, tournament names, event location, event time, and other characterizing information.

SDP matches for partner provided broadcasts result in grouping the partner contributions in the content distribution platform, by, for example, Sport, League, Tournament, Team, and Participant (SLTTP). For example, the SDP matches allow for collection pages and follow-SLTTP features for end customers. In some embodiments, the SDP component exposes Sports Data Reception APIs or S-APIs which enable broadcasting partners with rich sports data (SLTTP) to contribute factual SDP data. In some embodiments, P-APIs capture factual SDP data at individual broadcast level which are manually QC'd.

In some embodiments, the content distribution platform architecture does not publish detail pages in the case of unmatched SDP information. In some embodiments, a separate sports factual SDP data contribution path for creating SDP entities is sourced from partners.

Theme-5: Broadcast Lifecycle Management

A benefit of direct API integration with partners is to reduce schedule update latency. In some embodiments, the schedule update latency is less than 2 minutes. In some embodiments, the content distribution platform architecture reduces latency between partner and SPIN systems. In some embodiments, the content distribution platform architecture reduces or optimizes the latency between SPIN and customer facing applications via a Lifecycle management systems (LCSS/SVC) component. In some embodiments, the state automation blueprint is schedule based as it is for LEL. In some embodiments, a lifecycle automation component (LESA) reacts substantially instantly (sub seconds) to schedule changes. In some embodiments, 99.9% of schedule updates are reflected in less than 15 minutes in the Lifecycle management component. In some embodiments, C-APIs take down detail pages. In some embodiments, lifecycle systems ignore taken down events from liveliness rollup.

The lifecycle data may be used by content distribution platform 100 to represent various distribution states of a program or broadcast. For example, lifecycle data may represent a pre-broadcast stage corresponding to the time when the broadcast is in the future with an unknown broadcast time or date, a pre-broadcast stage corresponding to the time when the broadcast is in the future with a known or scheduled broadcast time and/or date, a broadcast stage corresponding to the time when the broadcast is being broadcast, a post-broadcast stage corresponding to the time when the broadcast is available but not live, and a post-broadcast stage corresponding to the time when the broadcast is no longer available. Other lifecycle stages may be additionally or alternatively represented by the lifecycle data. Accordingly, lifecycle data may include identifications of the event or broadcast, lifecycle stage data, which lifecycle stages the event or broadcast is scheduled to experience, times and dates when the event or broadcast is scheduled to change lifecycle stages, and other lifecycle information.

In some embodiments, reduced latency is achieved with schedule updates directly flowing to lifecycle systems via a lifecycle gateway (e.g., Bifrost). In some embodiments, partner provided broadcast schedule is considered accurate, and scheduling is decoupled from event design templates and the live events publishing (LEP) workflow. In some embodiments, the schedule updates are directly routed from, for example, SPIN to Bifrost, and honored by the lifecycle management component, for example, to avoid playback issues. Decoupling the scheduling template further simplifies catalog management by extracting out broadcast state management concern from catalog management.

In some embodiments, the lifecycle management uses SCTE-35 information to automate broadcast lifecycle. SCTE-35 markers are in-band (within broadcast feed) indicators for broadcast start and end of a broadcast. In some embodiments, partners supporting SCTE-35 based schedule updates also provide updates via P-APIs.

In some embodiments, the content distribution platform includes referee capabilities to validate sports CX features. In some embodiments, the content distribution platform includes one or more referee components which perform real time feature validations as the data flow from LEP to other content distribution platform components. For example, an update in title on a detail page or a state change to "Broadcast Start" may cause updating badging on respective Carousel tile and detail page. In some embodiments, the referee component receives updates in partner contribution as one more input and validates the updates impact on detail pages. For example, an update in schedule from a partner is validated by the referee component before the update is reflected on the detail page of a broadcast.

FIG. 1 illustrates a simplified block diagram of a content distribution platform 100 according to some embodiments. Content distribution platform 100 is configured to perform the functions described above and to perform the processes described with reference to FIGS. 2-6.

Content distribution platform 100 includes a broadcast data acquisition component 110, a rights management component 120, a sports data pipeline component 130, a broadcasting infrastructure orchestration component 140, a broadcast catalog management component 150, a lifecycle management component 160, the content delivery component 170, and a controller 180. Each of the components of content distribution platform 100 is communicatively coupled with one or more other components of content distribution platform 100 through one or more communication connections (not shown). The connections are not shown to simplify the figure as numerous connection configurations are contemplated, and embodiments are not limited to a particular connection configuration.

Broadcast data acquisition component 110 is configured to provide partner facing APIs (P-APIs) to capture broadcast video metadata and prepare the metadata for distributing it to downstream systems, such as other components of content distribution platform 100. The acquired metadata may, for example, characterize or be otherwise related to a particular event to be broadcast. Components within the broadcast metadata acquisition component capture, for example, editorial, sports, and scheduling information, for example, with the P-APIs. The broadcast data acquisition component 110 may also be configured to provide a ledger functionality to record partner provided metadata referred as "partner contributions" for manual or automatic quality checks and enhancements, which, for example, are used to ensure completeness, correctness, and timeliness of metadata. In some embodiments, upon detection of quality insufficiencies, the broadcast data acquisition component 110 is configured to one or more or all of: automatically correct the quality insufficiencies, automatically notify partners of the quality insufficiencies, automatically request corrections of the quality insufficiencies from partners.

In some embodiments, the broadcast data acquisition component 110 includes a Partner Entity Ingestion Adapter component configured to at least one of a) Resolve existing LEL vendor configuration for provided partner station identifier, and b) Submit feed info, rights & policies extracted from vendor configuration along with other partner contributions to SVC for publishing detail pages. In some embodiments, P-APIs support capturing at least one of a) Broadcast feed configuration, and b) Rights & Policy information.

In some embodiments, P-APIs ensure sufficient metadata is collected in order to publish a detail page. With P-APIs having captured metadata and right/policy information captured as part of vendor configuration, the content distribution platform architecture publishes detail page according to the captured metadata and right/policy information. In some embodiments, the broadcast data acquisition component 110 transmits partner sourced broadcast metadata to SVC via an interface, for example, provided by the broadcast catalog management component 150.

Broadcast data acquisition component 110 is also configured to provide partner facing APIs (P-APIs) to capture broadcast video and audio data of the live event being broadcast and prepare the data for distributing it to downstream systems, such as, for example, broadcast catalog management component 150 and/or other components of content distribution platform 100 for broadcasting by content delivery component 170. In some embodiments, broadcast data acquisition component 110 is configured to provide separate partner facing APIs (P-APIs) to capture each of broadcast video and audio data of the live event being broadcast.

In some embodiments, the broadcast data acquisition component 110 is configured to provide a single P-API for broadcast video data and multiple P-APIs for broadcast audio to support, for example, end-user selection of one of multiple audio sources to listen to while watching the video data of the live event. For example, the end user may select one of multiple sources of live event commentary provided by a corresponding one of multiple commentator partners.

Rights management component 120 is configured to resolve partner level policies (e.g., recording policy and discovery windows) and legal rights agreement information. In some embodiments, lookup of rights agreement information from a database by the rights management component 120 is automated because the rights management component 120 interfaces or is integrated with an agreement playbook component storing legal agreement information in the database for comparison with the right/policy information acquired by the broadcast data acquisition component 110. Rights and policy resolution results may be recorded to, for example, comply with any legal auditing requirements. In some embodiments, partner specific integration (e.g. —Adapting to a poll model, such as that used by Paramount+ instead of an API based push model) adapters are used, for example, integrated with or outside of the broadcast data acquisition component 110 boundary, for example, towards partner domain.

Sports data pipeline component 130, includes or is configured to acquire factual SDP data including, for example, Sport, League, Tournament, Team, and Participant (SLTTP) data.

Broadcasting infrastructure orchestration component 140 is configured to orchestrate broadcasting infrastructure. For example, broadcasting infrastructure orchestration component 140 may be configured to interface with a service provider to acquire access to broadcast services organized, for example, in a playback stack. The broadcasting infrastructure orchestration component 140 may provide asset identifications for the playback stack to one or more other components of content distribution platform 100. For example, broadcasting infrastructure orchestration component 140 may provide asset identifications for the playback stack to the broadcast catalog management component 150 for use in broadcasting the event associated with the provider metadata.

In some embodiments, a LEL vendor configuration process launches, for example, 16 Disney+ ad-hoc stations. In some embodiments, feed configuration and policy information is provided by the broadcast/partner to allow the broadcasting infrastructure orchestration component 140 to cause dynamic stand-up or tear down the playback feed infrastructure. The dynamic feed orchestration process may enable, for example, partners, such as Paramount+ and Disney+, to drop 24/7 linear stations. Additionally or alternatively, the dynamic feed orchestration process may enable the content distribution platform to eliminate or reduce the need to maintain 24/7 linear feeds. In some embodiments, the broadcasting infrastructure orchestration component 140 is configured to provide one or more "Spectrum" systems which act as portal for setting up dynamic feeds. In some embodiments, the broadcasting infrastructure orchestration component 140 extracts out broadcast asset (VCID) acquisition from a Live Events Ingestion (LEI) process and submits the broadcast assets into the broadcast catalog management component 150. Having the broadcasting infrastructure orchestration component 140 manage VCID assignments decouples video asset management from catalog management and simplifies the system. In some embodiments, a recording orchestrator (LEROS) may be integrated with or may be outside of the broadcasting infrastructure orchestration component 140.

In some embodiments, the broadcasting infrastructure orchestration component 140 scales on-boarding linear ad-hoc feeds are by one or more of a) Setup of station level vendor configuration, and b) Testing of linear feeds. These simplifications enable or simplify on-boarding of remaining numerous additional ad-hoc stations and additional linear ad-hoc stations, which may, for example, require manual effort.

Broadcast catalog management component 150 is configured to automatically check quality of metadata sourced from partners to verify and/or enforce baseline expected standards. With established metadata quality, the architecture publishes customer facing ad-hoc content while achieving-a) Automation of QC capabilities, and b) Enhancement of video catalog data. In some embodiments, the architecture uses other programs like automated merge of multi-sourced events (MSE) in the detailed workstreams to generate catalog data based on partner metadata and SDP data which achieves these outcomes prior to providing the generated catalog data to content delivery component 170 for broadcasting or publication. In some embodiments, quality check and enhancement functions correct issues in the staged partner contributions data or metadata received by the broadcast catalog management component 150 from the broadcast data acquisition component 110 which would otherwise corrupt the flow of data to publish detail pages. In some embodiments, upon detection of quality insufficiencies, the broadcast catalog management component 150 is configured to one or more or all of: automatically correct the quality insufficiencies, automatically notify partners of the quality insufficiencies, automatically request corrections of the quality insufficiencies from partners.

Some systems, such as Disney+, publish metadata of 16 LEL, or the like, stations as EPG files, or the like, in a shared file storage location with Digiflex, or the like, operators. In some systems, Partner Onboarding Managers (POM) assess the quality of the EPG files and schedule update quality for events to establish quality baseline for broadcast level partner contributions. In some embodiments, upon detection of quality insufficiencies, the broadcast catalog management component 150 is configured to one or more or all of: automatically correct the quality insufficiencies, automatically notify partners of the quality insufficiencies, automatically request corrections of the quality insufficiencies from partners.

In some embodiments, the broadcast catalog management component 150 is configured to identify gaps and direction for prioritizing automated QC and intervention capabilities. In some embodiments, manual QC may additionally or alternatively be used, for example, where the detail page publishing logs is recorded (both failure and success logs). In some embodiments, a detail page is QC'd manually by, for example, Digiflex for quality based on live event data quality standard (e.g.—in parity with IP data quality). Quality problems with partner sourced metadata may be reported back to partner via, for example, daily or weekly reports using automated communications. In some embodiments, upon detection of quality insufficiencies, the broadcast catalog management component 150 is configured to one or more or all of: automatically correct the quality insufficiencies, automatically notify partners of the quality insufficiencies, automatically request corrections of the quality insufficiencies from partners.

Historically, it has been a challenge to monitor the content within a broadcast feed (e.g. —EPL feed showing in-between slates which risks ending broadcast streams). However, in embodiments discussed herein, QC monitoring of broadcast content is automatically performed by the broadcast catalog management component 150. In some embodiments, quality of broadcast metadata is automatically enhanced, for example, to meet standards by the broadcast catalog management component 150. In some embodiments, selective or limited manual quality enhancement may be performed, for example, by exception. In some embodiments, validation results and quality metrics are both managed by, for example, a Real-time data sink (RTDS) component. In some embodiments, the RTDS component is monitored for identifying and allotting manual intervention work (e.g.—intervene if basketball titled event is actually baseball). In some embodiments, upon detection of quality insufficiencies, the broadcast catalog management component 150 is configured to one or more or all of: automatically correct the quality insufficiencies, automatically notify partners of the quality insufficiencies, automatically request corrections of the quality insufficiencies from partners.

In some embodiments, Playback quality (Quality of Service-QoS) metrics are also managed by, for example, the RTDS component, and are used for reporting back to a partner using Reporting APIs (R-APIs).

In some embodiments, the broadcast data acquisition component 110 includes a set of "Spectrum" systems which act as portal for setting up dynamic feeds. In some embodiments, the architecture extracts out broadcast asset (VCID) acquisition from a Live Events Ingestion (LEI) process and submits these broadcast assets into the broadcast catalog management component 150. Moving VCID assignment upward decouples video asset management from catalog management and simplifies the system.

In some embodiments, on-boarding linear ad-hoc feeds are scaled by simplifying-a) Setup of station level vendor configuration, and b) Testing of linear feeds. These simplifications of the distribution platform enable or simplify on-boarding of remaining numerous additional ad-hoc stations and additional linear ad-hoc stations, which may, for example, require manual effort.

In some embodiments, P-APIs of the broadcast data acquisition component 110 ensure sufficient data is collected in order to publish a detail page. With P-APIs having captured metadata and right/policy information captured as part of vendor configuration, the broadcast catalog management component 150 publishes detail page according to the captured metadata and the right/policy information captured by the rights management component 120. Partner sourced broadcast metadata may be transmitted to SVC via an interface, for example, provided by the broadcast catalog management component 150. The APIs provided by the broadcast catalog management component 150 may be referred to as SVC APIs or C-APIs. C-APIs define a minimum set of data required for publishing a quality detail page. In some embodiments, the C-APIs at least capture data in parity with the data supplied by LE-APIs via vendor configuration for an LEL event which includes region level territory restriction and support for experiment group.

In some embodiments, the broadcast catalog management component 150 matches partner provided sports broadcast metadata with sports entity present, for example, in or from the sports data pipeline component 130. In some embodiments, the broadcast catalog management component 150 is configured to enhance catalog data (improving quality or filling missing data) by adding data from the sports data pipeline component 130 to the metadata from broadcast data acquisition component 110. In some embodiments, the broadcast catalog management component 150 is configured to enhance catalog data (improving quality or filling missing data) by replacing data from the broadcast data acquisition component 110 with data from sports data pipeline component 130. In some embodiments, a baseline match rate is recorded for prioritizing programs. In some embodiments, C-APIs ingest VCID as referred in Theme-3 above. In some embodiments, upon detection of quality insufficiencies, the sports data pipeline component 130 is configured to one or more or all of: automatically correct the quality insufficiencies, automatically notify partners of the quality insufficiencies, automatically request corrections of the quality insufficiencies from partners.

SDP matches for partner provided broadcasts result in the broadcast catalog management component 150 grouping the partner contributions in the content distribution platform, by, for example, one or more of Sport, League, Tournament, Team, and Participant (SLTTP). For example, the SDP matches may cause the broadcast catalog management component 150 to collect pages and follow-SLTTP features for end customers. In some embodiments, the sports data pipeline component 130 exposes Sports Data Reception APIs or S-APIs which enable broadcasting partners with rich sports data (SLTTP) to contribute factual SDP data. In some embodiments, the P-APIs or S-APIs capture factual SDP data at individual broadcast level which may be automatically QC'd by the broadcast catalog management component 150. In some embodiments, the sports data pipeline component 130 exposes Sports Data Reception APIs or S-APIs which enable broadcasting partners to contribute live SDP data related to the live event being broadcast by the content distribution platform 100, where the live SDP data is changing based on activities of the live event being broadcast. In some embodiments, the P-APIs or S-APIs capture live SDP data at individual broadcast level which may be automatically QC'd by the broadcast catalog management component 150.

In some embodiments, the content distribution platform 100 does not publish detail pages in the case of unmatched SDP information. In some embodiments, a separate sports factual SDP data contribution path for creating SDP entities is sourced from partners.

In some embodiments, the broadcast catalog management component 150 includes referee capabilities to validate sports CX features. In some embodiments, the broadcast catalog management component 150 includes one or more referee components which perform real time feature validations as the data flow from LEP to other content distribution platform components, such as to the content delivery component 170 for broadcast. For example, an update in title on a detail page or a state change to "Broadcast Start" may cause updating badging on respective Carousel tile and detail page. In some embodiments, the referee component receives updates in partner contribution as an additional input and validates the updates impact on detail pages. For example, an update in schedule from a partner is validated by the referee component before the update is reflected on the detail page of a broadcast.

Lifecycle management component 160 interfaces directly with broadcast metadata acquisition component, for example, to advantageously reduce schedule update latency. In some embodiments, the schedule update latency is less than 2 minutes. In some embodiments, the direct interface reduces latency between partner and SPIN systems. In some embodiments, the direct interface reduces or optimizes the latency between SPIN and customer facing applications via the lifecycle management component 160. In some embodiments, a state automation blueprint is schedule based as it is for LEL. In some embodiments, a lifecycle automation component (LESA) of the lifecycle management component 160 reacts substantially instantly (sub seconds) to schedule changes. In some embodiments, 99.9% of schedule updates are reflected in less than 15 minutes in the lifecycle management component 160. In some embodiments, C-APIs take down detail pages. In some embodiments, the lifecycle management component 160 ignores taken down events from liveliness rollup.

In some embodiments, reduced latency is achieved with schedule updates directly flowing to lifecycle management component 160 via a lifecycle gateway (e.g., Bifrost). In some embodiments, partner provided broadcast schedule is considered by lifecycle management component 160 as being accurate, and scheduling is decoupled from event design templates and the live events publishing (LEP) workflow. In some embodiments, the schedule updates are directly routed from, for example, SPIN to Bifrost, and honored by the lifecycle management component 160, for example, to avoid playback issues. Decoupling the scheduling template further simplifies catalog management by extracting out broadcast state management concern from catalog management.

In some embodiments, the lifecycle management component 160 uses SCTE-35 information to automate broadcast lifecycle. SCTE-35 markers are in-band (within broadcast feed) indicators for broadcast start and end of a broadcast. In some embodiments, partners supporting SCTE-35 based schedule updates also provide updates to lifecycle management component 160 via P-APIs.

Content delivery component 170 is configured to broadcast the content of the live event. The content is broadcast using broadcasting service assets of a playback stack identified by asset identifications acquired by broadcasting infrastructure orchestration component 140 and transmitted to content delivery component 170 by broadcast catalog management component 150. The content is broadcast based on live event data received by content distribution platform 100 through the P-APIs of the broadcast data acquisition component 110 and processed by the other components of content distribution platform 100. The content is also broadcast based on partner metadata received by content distribution platform 100 through the P-APIs of the broadcast data acquisition component 110 and enhanced by the other components of content distribution platform 100, such as by broadcast catalog management component 150 according to SDP data received from sports data pipeline component 130.

Controller 180 is communicatively coupled, for example, with each of broadcast data acquisition component 110, rights management component 120, sports data pipeline component 130, broadcasting infrastructure orchestration component 140, broadcast catalog management component 150, lifecycle management component 160, and content delivery component 170, and is configured to generate control signals for each of the components. The control signals because the components to perform the functions described elsewhere herein. In some embodiments, control signals cause a first component to transmit data to a second component via the controller 180. In some embodiments, control signals cause a first component to transmit data directly to a second component.

Figure 2:
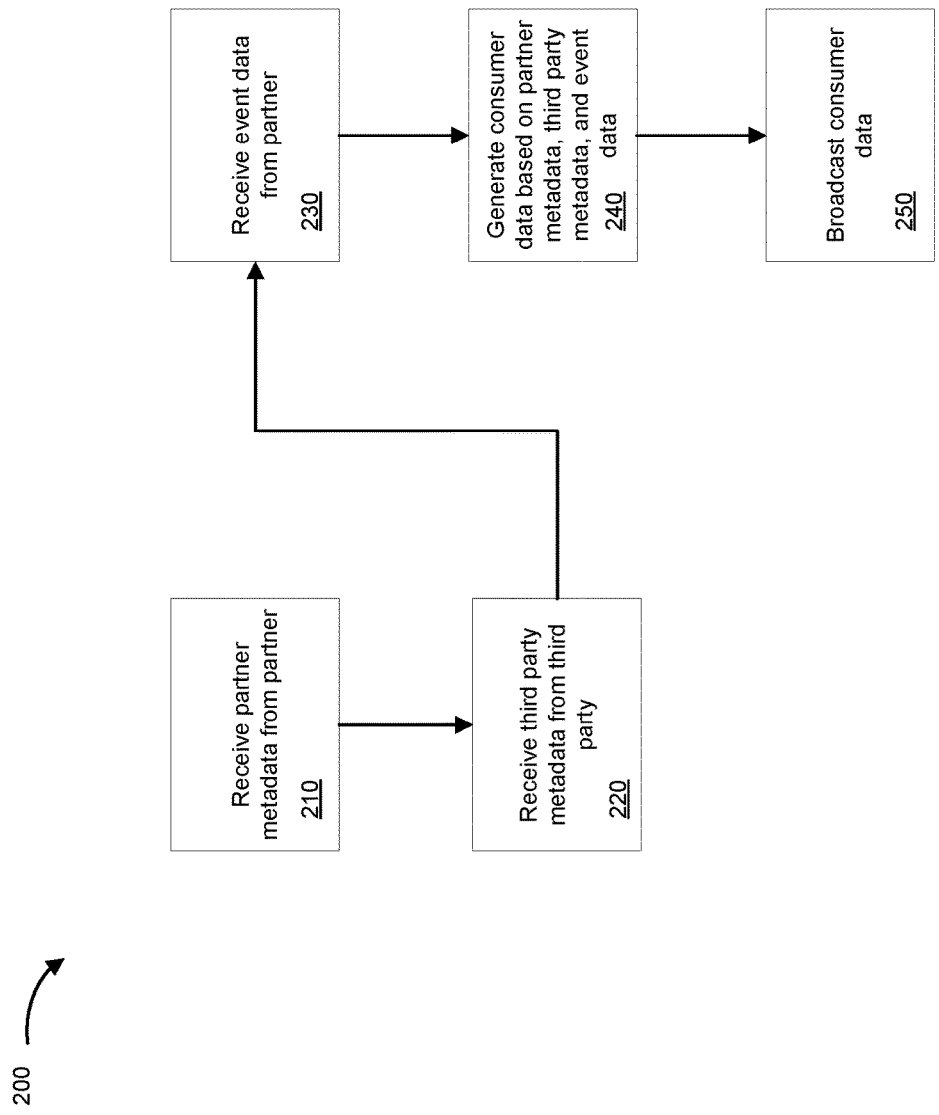
FIG. 2 is a flowchart diagram of a method of broadcasting consumer data according to some embodiments.

FIG. 2 is a flowchart diagram of a method 200 of broadcasting consumer data according to some embodiments. Some or all of the method 200 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors or controllers. The computer-readable storage medium may be non-transitory.

For example, method 200 may be performed by content distribution platform 100 of FIG. 1 or another content distribution platform. As described below, the various processes of method 200 may be performed by particular components of content distribution platform 100. It is to be understood that the attributions of the particular processes to the particular components are simply examples, and that any other attributions are possible. For example, each of the processes may be performed by other components of content distribution platform 100 where each of the processes may be performed by other components of other content distribution platforms.

At 210, broadcast data acquisition component 110 of content distribution platform 100 receives partner metadata, for example, according to principles similar or identical to those discussed above, for example, with reference to FIG. 1 or elsewhere.

At 220, sports data pipeline component 130 receives third party metadata from a third-party metadata source. The third-party metadata may, for example, be SDP metadata from an SDP metadata provider. In addition, sports data pipeline component 130 provides the third-party metadata to broadcast catalog management component 150, for example, according to principles similar or identical to those described above with reference to FIG. 1 or elsewhere.

At 230, broadcast data acquisition component 110 receives live event broadcast data, for example, as described above with reference to FIG. 1 or elsewhere. In addition, broadcast data acquisition component 110 provides the received live event broadcast data to broadcast catalog management component 150, for example, according to principles similar or identical to those described above with reference to FIG. 1 or elsewhere.

At 240, broadcast catalog management component 150 generates consumer data for broadcasting based on the partner metadata received at 210, the third-party metadata received at 220, and the live event broadcast data received at 230. The consumer data is generated based on principles similar or identical to those discussed above, for example, with reference to FIG. 1 or elsewhere.

At 250, content delivery component 170 delivers the consumer data generated at 240 to consumers, for example, by causing the consumer data to be broadcasted, for example, according to principles similar or identical to those described above with reference to FIG. 1 or elsewhere.

Figure 3:
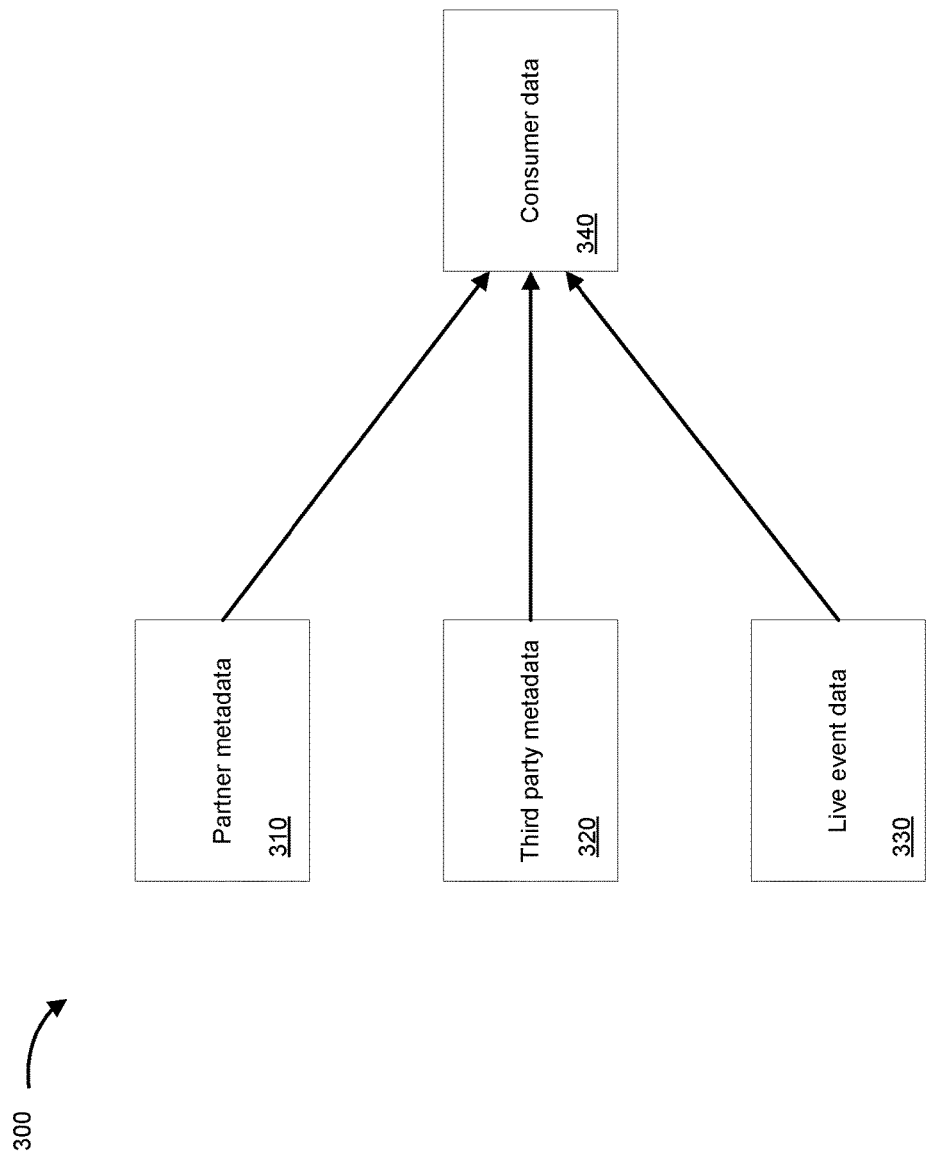
FIG. 3 illustrates a graphical representation of a process of the method of FIG. 2.

FIG. 3 illustrates a graphical representation 300 of the process 240 of method 200, for example, as performed by broadcast catalog management component 150 according to principles similar or identical to those described above, for example, with reference to FIG. 1 or elsewhere. As illustrated, the consumer data 340 to be broadcast is generated based on each of partner metadata 310, third party metadata 320, and live event data 330.

Figure 4:
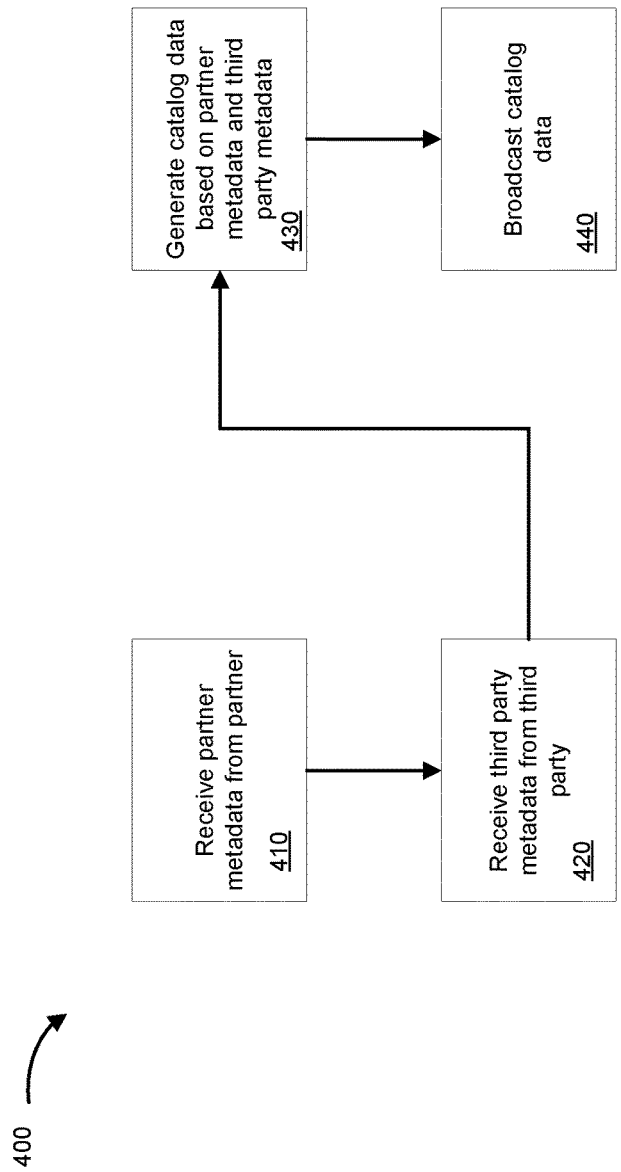
FIG. 4 is a flowchart diagram of a method of publishing catalog data according to some embodiments.

FIG. 4 is a flowchart diagram of a method 400 of publishing catalog data according to some embodiments. Method 400 may be performed by content distribution platform 100 of FIG. 1 or another content distribution platform. As described below, the various processes of method 400 may be performed by particular components of content distribution platform 100. It is to be understood that the attributions of the particular processes to the particular components are simply examples, and that any other attributions are possible. For example, each of the processes may be performed by other components of content distribution platform 100 where each of the processes may be performed by other components of other content distribution platforms.

At 410, broadcast data acquisition component 110 of content distribution platform 100 receives partner metadata, for example, according to principles similar or identical to those discussed above, for example, with reference to FIG. 1 or elsewhere.

At 420, sports data pipeline component 130 receives third party metadata from a third-party metadata source. The third-party metadata may, for example, be SDP metadata from an SDP metadata provider. In addition, sports data pipeline component 130 provides the third-party metadata to broadcast catalog management component 150, for example, according to principles similar or identical to those described above with reference to FIG. 1 or elsewhere.

At 430, broadcast catalog management component 150 generates catalog data for broadcasting based on the partner metadata received at 210 and the third-party metadata received at 220. The catalog data may comprise partner metadata modified or enhanced by the broadcast catalog management component 150. The catalog data is generated based on principles similar or identical to those discussed above, for example, with reference to FIG. 1 or elsewhere.

At 440, content delivery component 170 delivers the catalog data generated at 430 to consumers through, for example, publishing or broadcasting, for example, by causing the catalog data to be broadcasted, for example, according to principles similar or identical to those described above with reference to FIG. 1 or elsewhere.

Figure 5:
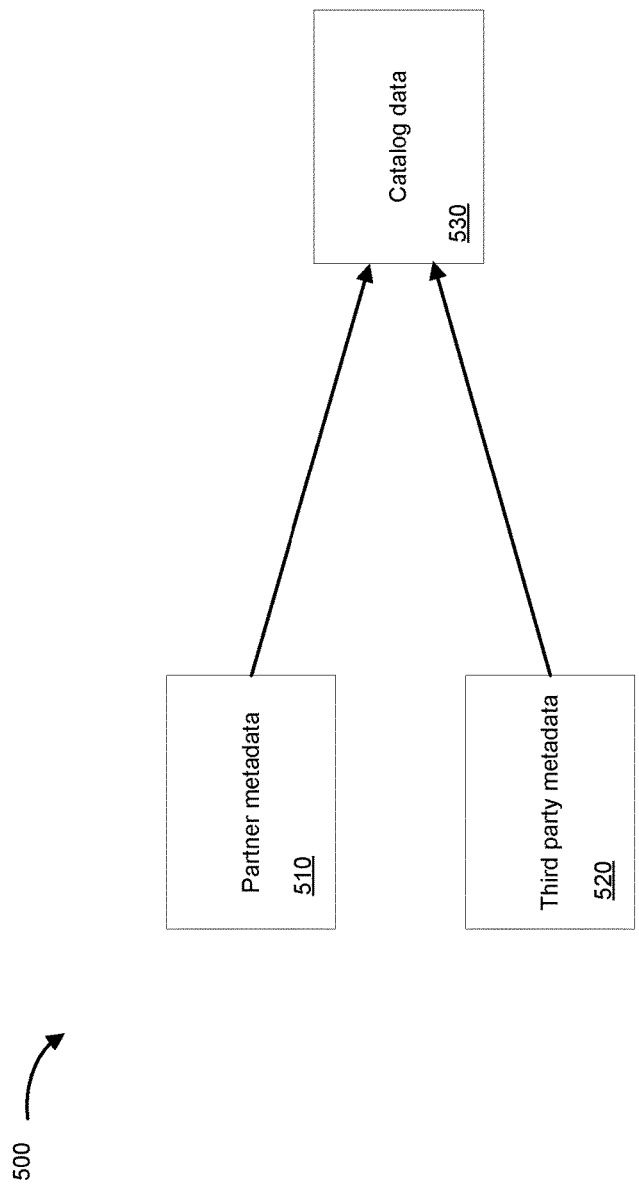
FIG. 5 illustrates a graphical representation of a process of the method of FIG. 4.

FIG. 5 illustrates a graphical representation 500 of the process 430 of method 400, for example, as performed by broadcast catalog management component 150 according to principles similar or identical to those described above, for example, with reference to FIG. 1 or elsewhere. As illustrated, the catalog data 530 to be broadcast or published is generated based on each of partner metadata 510 and third-party metadata 520. The catalog data may comprise partner metadata modified or enhanced by the broadcast catalog management component 150.

Figure 6:
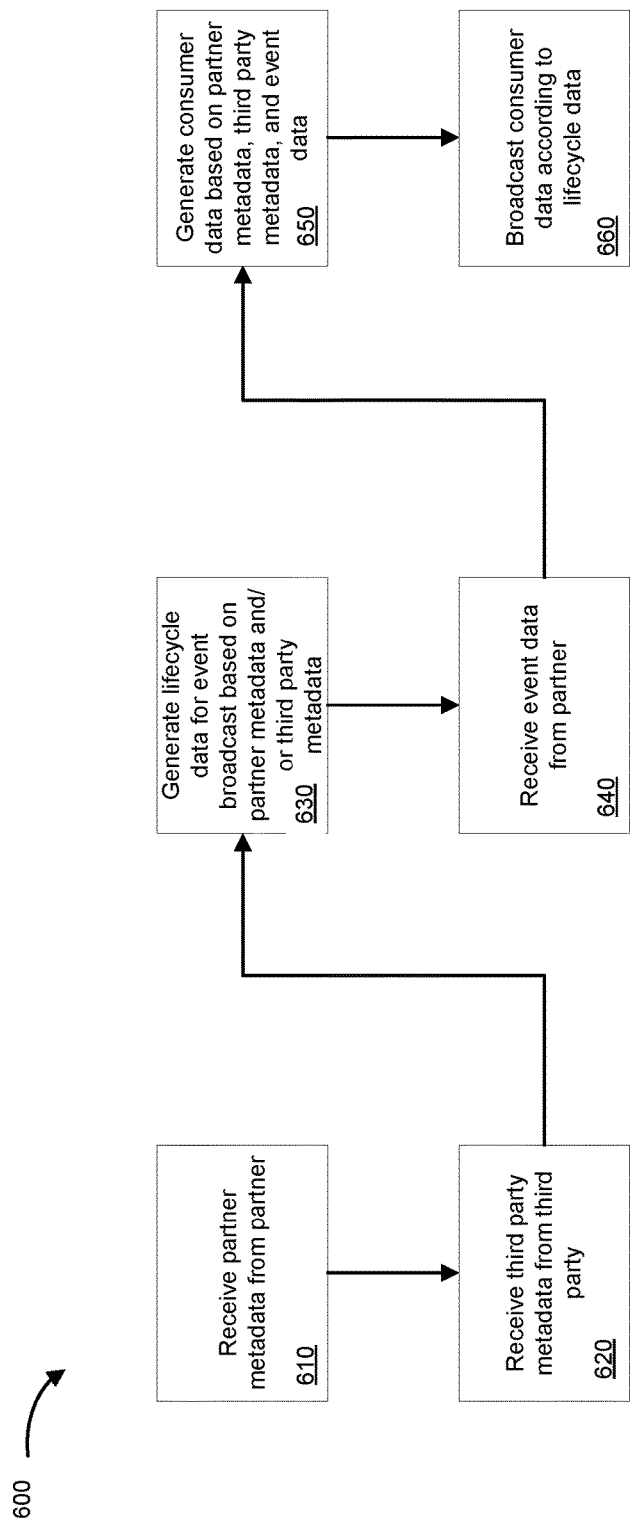
FIG. 6 is a flowchart diagram of a method of broadcasting consumer data according to some embodiments.

FIG. 6 is a flowchart diagram of a method 600 of broadcasting consumer data according to some embodiments. Method 600 may be performed by content distribution platform 100 of FIG. 1 or another content distribution platform. As described below, the various processes of method 600 may be performed by particular components of content distribution platform 100. It is to be understood that the attributions of the particular processes to the particular components are simply examples, and that any other attributions are possible. For example, each of the processes may be performed by other components of content distribution platform 100 where each of the processes may be performed by other components of other content distribution platforms.

At 610, broadcast data acquisition component 110 of content distribution platform 100 receives partner metadata, for example, according to principles similar or identical to those discussed above, for example, with reference to FIG. 1 or elsewhere.

At 620, sports data pipeline component 130 receives third party metadata from a third-party metadata source. The third-party metadata may, for example, be SDP metadata from an SDP metadata provider. In addition, sports data pipeline component 130 provides the third-party metadata to broadcast catalog management component 150, for example, according to principles similar or identical to those described above with reference to FIG. 1 or elsewhere.

At 630, lifecycle management component 160 generates lifecycle data for broadcasting based on the partner metadata received at 610 and/or the third-party metadata received at 620. The lifecycle data is generated based on principles similar or identical to those discussed above, for example, with reference to FIG. 1 or elsewhere.

At 640, broadcast data acquisition component 110 receives live event broadcast data, for example, as described above with reference to FIG. 1 or elsewhere. In addition, broadcast data acquisition component 110 provides the received live event broadcast data to broadcast catalog management component 150, for example, according to principles similar or identical to those described above with reference to FIG. 1 or elsewhere.

At 650, broadcast catalog management component 150 generates consumer data for broadcasting based on the partner metadata received at 610, the third-party metadata received at 620, and the live event broadcast data received at 640. The consumer data is generated based on principles similar or identical to those discussed above, for example, with reference to FIG. 1 or elsewhere.

At 660, content delivery component 170 delivers the consumer data generated at 650 to consumers, for example, by causing the consumer data to be broadcasted, for example, according to principles similar or identical to those described above with reference to FIG. 1 or elsewhere, where the consumer data is delivered according to the lifecycle data generated at 630.

Figure 7:
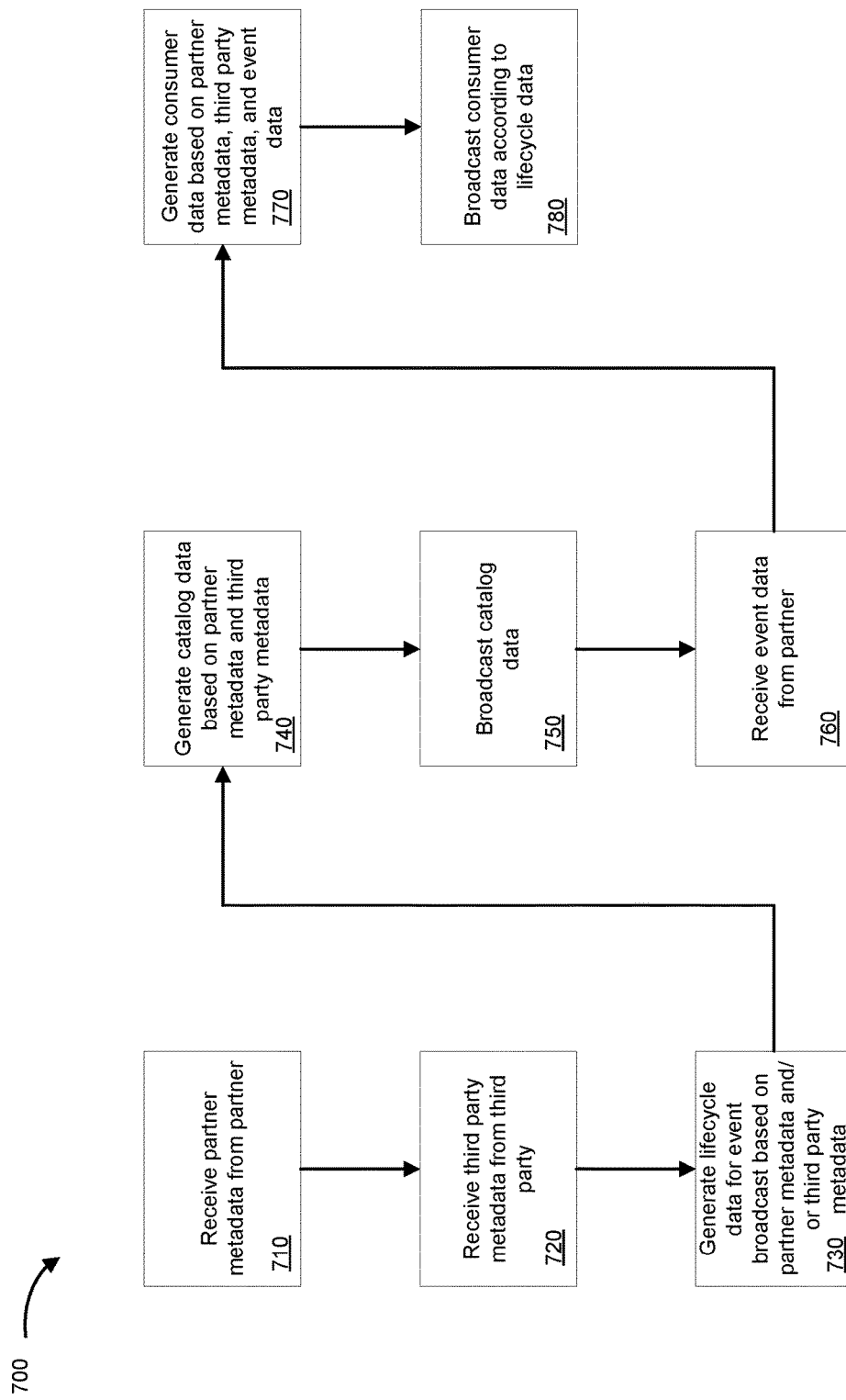
FIG. 7 is a flowchart diagram of a method of broadcasting consumer data according to some embodiments.

FIG. 7 is a flowchart diagram of a method 700 of broadcasting consumer data according to some embodiments. Method 700 may be performed by content distribution platform 100 of FIG. 1 or another content distribution platform. As described below, the various processes of method 700 may be performed by particular components of content distribution platform 100. It is to be understood that the attributions of the particular processes to the particular components are simply examples, and that any other attributions are possible. For example, each of the processes may be performed by other components of content distribution platform 100 where each of the processes may be performed by other components of other content distribution platforms.

At 710, broadcast data acquisition component 110 of content distribution platform 100 receives partner metadata, for example, according to principles similar or identical to those discussed above, for example, with reference to FIG. 1 or elsewhere.

At 720, sports data pipeline component 130 receives third party metadata from a third-party metadata source. The third-party metadata may, for example, be SDP metadata from an SDP metadata provider. In addition, sports data pipeline component 130 provides the third-party metadata to broadcast catalog management component 150, for example, according to principles similar or identical to those described above with reference to FIG. 1 or elsewhere.

At 730, lifecycle management component 160 generates lifecycle data for broadcasting based on the partner metadata received at 710 and/or the third-party metadata received at 720. The lifecycle data is generated based on principles similar or identical to those discussed above, for example, with reference to FIG. 1 or elsewhere.

At 740, broadcast catalog management component 150 generates catalog data for broadcasting based on the partner metadata received at 710 and the third-party metadata received at 720. The catalog data may comprise partner metadata modified or enhanced by the broadcast catalog management component 150. The catalog data is generated based on principles similar or identical to those discussed above, for example, with reference to FIG. 1 or elsewhere.

At 750, content delivery component 170 delivers the catalog data generated at 740 to consumers by causing the catalog data to be published or broadcasted, for example, according to principles similar or identical to those described above with reference to FIG. 1 or elsewhere.

At 760, broadcast data acquisition component 110 receives live event broadcast data, for example, as described above with reference to FIG. 1 or elsewhere. In addition, broadcast data acquisition component 110 provides the received live event broadcast data to broadcast catalog management component 150, for example, according to principles similar or identical to those described above with reference to FIG. 1 or elsewhere.

At 770, broadcast catalog management component 150 generates consumer data for broadcasting based on the partner metadata received at 710, the third-party metadata received at 720, and the live event broadcast data received at 760. The consumer data is generated based on principles similar or identical to those discussed above, for example, with reference to FIG. 1 or elsewhere.

At 780, content delivery component 170 delivers the consumer data generated at 770 to consumers, for example, by causing the consumer data to be broadcasted, for example, according to principles similar or identical to those described above with reference to FIG. 1 or elsewhere, where the consumer data is delivered according to the lifecycle data generated at 730.

Figure 8:
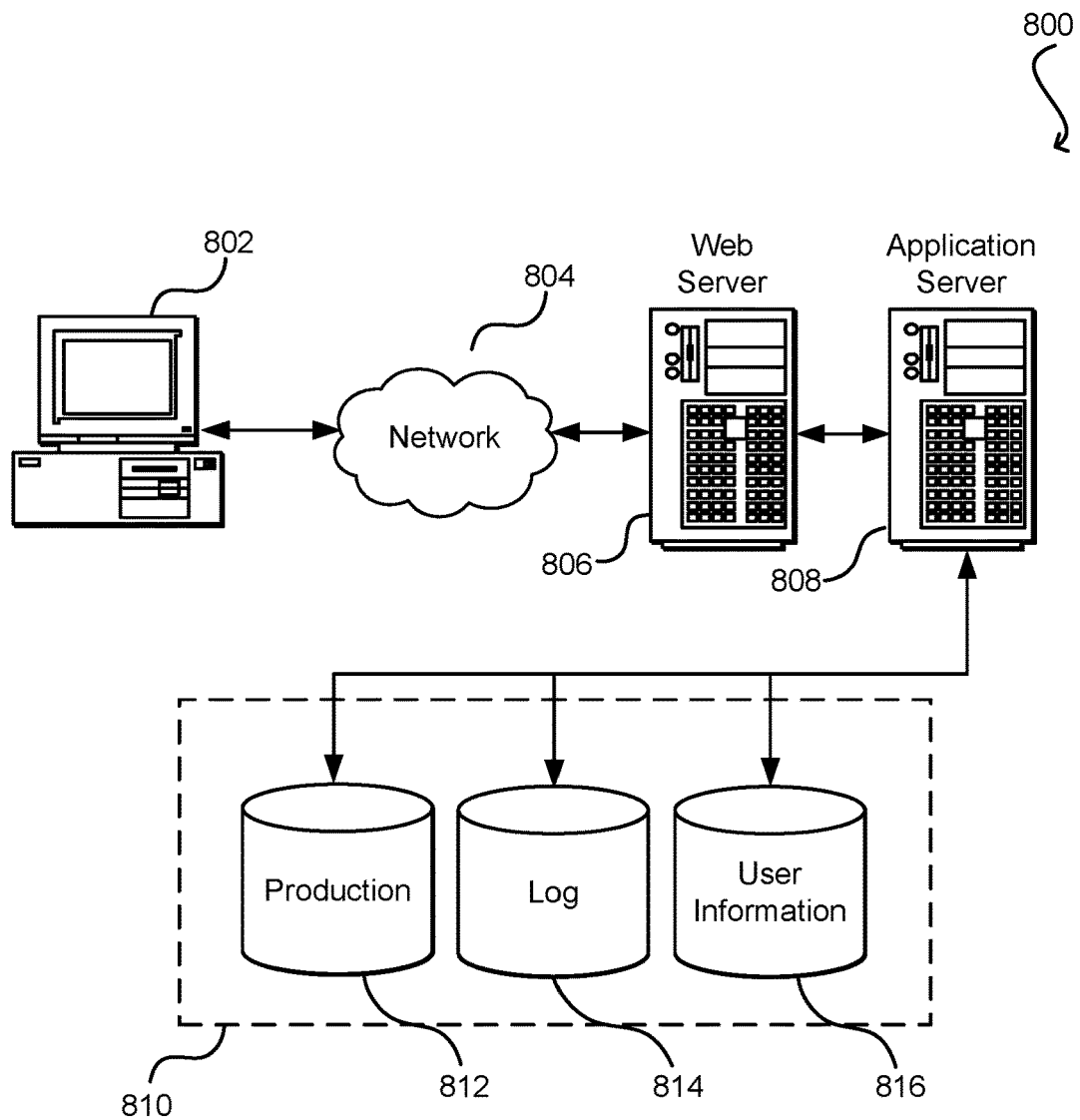
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 802. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 806 or other servers over the network 804 or other networks.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the 10 above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
receiving, by a computing device, partner metadata from a partner facing application programming interface (API), the partner metadata being related to a broadcast of an event to be subsequently transmitted to the partner facing API;
receiving, by the computing device, third-party metadata from a third-party metadata source facing API, the third-party metadata being related to the broadcast, and the third-party metadata being at least partially related to the partner metadata;
generating, by the computing device, lifecycle data based at least in part on the partner metadata;
generating, by the computing device, catalog data based at least in part on the partner metadata and the third-party metadata, the catalog data comprising partner metadata modified by the computing device;

causing, by the computing device, the catalog data to be published;

receiving, by the computing device, event data from the partner facing API, the event data representing the event, and the event data comprising data to be included in the broadcast;

generating, by the computing device, broadcastable consumer data based at least in part on the partner metadata, the third-party metadata, or the event data, the broadcastable consumer data comprising partner metadata modified by the computing device; and causing, by the computing device, the broadcastable consumer data to be broadcasted according to the lifecycle data.

2. The computer-implemented method of claim 1, wherein the event data comprises video data of a live sports event.

3. The computer-implemented method of claim 1, wherein the third-party metadata is selected from a database based at least in part on the partner metadata.

4. The computer-implemented method of claim 3, wherein the third-party metadata comprises data from a sports data aggregator.

5. A computer system, comprising:
one or more processors; and
a memory storing executable instructions that, upon execution by the one or more processors, cause the computer system to execute operations to:
receive partner metadata from a partner facing application programming interface (API), the partner metadata being related to a broadcast of an event to be subsequently transmitted to the partner facing API;
receive third-party metadata from a third-party metadata source facing API, the third-party metadata being related to the broadcast, and the third-party metadata being at least partially related to the partner metadata;
receive event data from the partner facing API, the event data representing the event, and the event data comprising data to be included in the broadcast;
generate broadcastable consumer data based at least in part on the partner metadata, the third-party metadata, or the event data, the broadcastable consumer data comprising partner metadata modified by the one or more processors; and
cause the broadcastable consumer data to be broadcasted.

6. The computer system of claim 5, wherein the event data comprises video data of a live sports event.

7. The computer system of claim 5, wherein the third-party metadata is selected from a database based at least in part on the partner metadata.

8. The computer system of claim 7, wherein the third-party metadata comprises data from a sports data aggregator.

9. The computer system of claim 5, the memory storing executable instructions that, upon execution by the one or more processors, cause the computer system to execute operations to:
receive event audio data comprising audio data related to the event; and
generate the consumer data based additionally on the event audio data.

10. The computer system of claim 5, the memory storing executable instructions that, upon execution by the one or more processors, cause the computer system to execute operations to:

receive first event audio data comprising audio data related to the event;
receive second event audio data comprising audio data related to the event;
receive a selection indicating one of the first and second event audio data; and
generate the consumer data based additionally on the indicated first or second event audio data.

11. The computer system of claim 5, wherein the event data comprises video data of a live sports event, and wherein the memory storing executable instructions that, upon execution by the one or more processors, cause the computer system to execute operations to:
receive live event data related to the live sports event from the partner facing API; and
generate the consumer data based additionally on the live event data.

12. The computer system of claim 5, wherein the partner metadata comprises one or more of sport identification data, league identification data, tournament identification data, team identification data, or participant identification data, and wherein the third-party metadata comprises one or more of sport identification data, league identification data, tournament identification data, team identification data, or participant identification data.

13. A non-transitory computer-readable storage medium storing computer-executable instructions that, when executed by one or more processors of a computing device, cause the computing device to:
receive partner metadata from a partner facing application programming interface (API), the partner metadata being related to a broadcast of an event to be subsequently transmitted to the partner facing API;
receive third-party metadata from a third-party metadata source facing API, the third-party metadata being related to the broadcast, and the third-party metadata being at least partially related to the partner metadata;
generate catalog data based at least in part on the partner metadata and the third-party metadata, the catalog data comprising partner metadata modified by the computing device;
cause the catalog data to be published;
receive event data from the partner facing API, the event data representing the event, and the event data comprising data to be included in the broadcast;
generate broadcastable consumer data based at least in part on the partner metadata, the third-party metadata, or the event data, the broadcastable consumer data comprising partner metadata modified by the computing device; and
cause the broadcastable consumer data to be broadcasted.

14. The non-transitory computer-readable storage medium of claim 13, wherein the event data comprises video data of a live sports event.

15. The non-transitory computer-readable storage medium of claim 13, wherein the third-party metadata is selected from a database based at least in part on the partner metadata.

16. The non-transitory computer-readable storage medium of claim 15, wherein the third-party metadata comprises data from a sports data aggregator.

17. The non-transitory computer-readable storage medium of claim 13, storing computer-executable instructions that, upon execution by the one or more processors, cause the computing device to execute operations to:
receive event audio data comprising audio data related to the event; and generate the consumer data based additionally on the event audio data.

18. The non-transitory computer-readable storage medium of claim 13, storing computer-executable instructions that, upon execution by the one or more processors, cause the computing device to execute operations to:
receive first event audio data comprising audio data related to the event;
receive second event audio data comprising audio data related to the event;
receive a selection indicating one of the first and second event audio data; and
generate the consumer data based additionally on the indicated first or second event audio data.

19. The non-transitory computer-readable storage medium of claim 13, wherein the event data comprises video data of a live sports event, and wherein the computer-readable storage medium stores computer-executable instructions that, upon execution by the one or more processors, cause the computing device to execute operations to:
receive live event data related to the live sports event from the partner facing API; and
generate the consumer data based additionally on the live event data.

20. The non-transitory computer-readable storage medium of claim 13, wherein the partner metadata comprises one or more of sport identification data, league identification data, tournament identification data, team identification data, or participant identification data, and wherein the third-party metadata comprises one or more of sport identification data, league identification data, tournament identification data, team identification data, or participant identification data.

* * * * *